US012699113B2

(12) United States Patent (10) Patent No.: US 12,699,113 B2
Liu et al. (45) Date of Patent: Aug. 4, 2026

(54) WHEEL SPEED SENSOR

(71) Applicant: Robert Bosch GmbH, Stuttgart (DE)

(72) Inventors: Kun Liu, Suzhou (CN); Hao Yuan,
Suzhou (CN); Qian Wang, Suzhou
(CN); Jinyang Li, Suzhou (CN)

(73) Assignee: Robert Bosch GmbH, Stuttgart (DE)

( * ) Notice: Subject to any disclaimer, the term of this
patent is extended or adjusted under 35
U.S.C. 154(b) by 153 days.

(21) Appl. No.: 18/167,845

(22) Filed: Feb. 11, 2023

(65) Prior Publication Data

US 2023/0258683 A1 Aug. 17, 2023

(30) Foreign Application Priority Data

Feb. 14, 2022 (CN) .......................... 202220289921.4

(51) Int. Cl.
*G01P 3/44* (2006.01)
(52) U.S. Cl.
CPC ..................................... *G01P 3/44* (2013.01)
(58) Field of Classification Search
CPC ........... G01P 1/026; H01L 2224/48247; H01L
2924/181
See application file for complete search history.

(56) References Cited

U.S. PATENT DOCUMENTS

| | | | | |
|---|---|---|---|---|
| 6,334,361 | B1 * | 1/2002 | De Volder | ............ B29C 33/126 |
| | | | | 73/431 |
| 2005/0274202 | A1 | 12/2005 | Sanada et al. | |
| 2011/0179889 | A1 * | 7/2011 | De Volder | ............ B29C 33/126 |
| | | | | 73/866.5 |
| 2015/0233959 | A1 | 8/2015 | Cobb, III et al. | |
| 2020/0225067 | A1 | 7/2020 | Offermann | |
| 2020/0408854 | A1 * | 12/2020 | Offermann | ......... G01R 33/0047 |
| 2021/0384664 | A1 | 12/2021 | Weller et al. | |
| 2024/0141956 | A1 * | 5/2024 | Jeon | ...................... F16C 41/007 |

FOREIGN PATENT DOCUMENTS

KR 10-1229459 B1 2/2013

* cited by examiner

*Primary Examiner* — Noam Reisner
(74) *Attorney, Agent, or Firm* — Maginot, Moore & Beck
LLP

(57) ABSTRACT
A wheel speed sensor, includes: one or more sensor chips,
each of which has a pair of pins; electrical terminals
arranged in pairs, each pair electrically connected to a pair
of pins of a sensor chip; a supporting member attached to a
first end of each electrical terminal; an end holder attached
adjacent to the supporting member to each electrical termi-
nal to prevent displacement of each electrical terminal
relative to each other; and at least one intermediate holder
attached to a body portion of each electrical terminal to
prevent displacement of the body portion of each electrical
terminal relative to each other.

11 Claims, 4 Drawing Sheets

10

WHEEL SPEED SENSOR

This application claims priority under 35 U.S.C. § 119 to patent application no. CN 2022 2028 9921.4, filed on Feb. 14, 2022 in China, the disclosure of which is incorporated herein by reference in its entirety.

BACKGROUND

The present disclosure relates to the technical field of sensors, in particular to a wheel speed sensor.

Motor vehicles are usually equipped with a wheel speed sensor (WSS), which is used to detect the speed of the vehicle, and can be configured on devices or systems on the vehicle, such as an electronic stability program (ESP), an anti-lock braking system (ABS), an automatic transmission control system, and a power assist system, to provide wheel speed information of the vehicle. Although many types of wheel speed sensors have been provided in the prior art, these existing wheel speed sensors still have some defects and deficiencies in aspects such as structural construction, producing process, use cost control, signal redundancy implementation, and reliability.

For example, in a wheel speed sensor including elongated electrical terminals, each electrical terminal is usually formed into one body first, then cut into a single electrical terminal, and then the electrical terminal is soldered to a pin of a sensor chip. Since each electrical terminal is relatively long, it is prone to deflection or relative displacement, which is not conducive to the accuracy or precision of signal transmission of the wheel speed sensor.

SUMMARY

An object of the present disclosure is to provide a wheel speed sensor with improved structure. To this end, the present application provides a wheel speed sensor, including a sensor housing and a sensor body assembly positioned inside the sensor housing, the sensor body assembly including: one or more sensor chips, each of the sensor chips including a pair of pins spaced apart in a transverse direction; one or more pairs of electrical terminals, each pair of the electrical terminals being electrically connected to a pair of pins of the sensor chip, each electrical terminal including an elongated body portion extending in a longitudinal direction perpendicular to the transverse direction and a first end electrically connected to a corresponding pin; a supporting member attached to the first end of each electrical terminal, the supporting member defining a groove used to mount every sensor chip of the one or more sensor chips and providing support for a connection between the pin of the sensor chip and the first end of the electrical terminal; an end holder attached adjacent to the supporting member to each electrical terminal to prevent displacement of each electrical terminal relative to each other; and at least one intermediate holder attached to the body portion of each electrical terminal to prevent displacement of the body portion of each electrical terminal relative to each other.

In an embodiment, the end holder and the supporting member are formed integrally or are spaced apart from each other; and/or the at least one intermediate holder includes only one intermediate holder, or includes a plurality of intermediate holders spaced apart from each other in the longitudinal direction L.

In an embodiment, the end holder and/or the intermediate holder have an oblong or polygonal outer profile in a cross-section perpendicular to the longitudinal direction, respectively include a through hole allowing each of the electrical terminals to extend through, and in a cross-section perpendicular to the transverse direction, the through hole completely surrounds a corresponding electrical terminal or encloses only a part of the corresponding electrical terminal.

In an embodiment, the intermediate holder includes two half bodies opposite to each other, and the through hole is jointly defined by the two opposite half bodies.

In an embodiment, the end holder and the supporting member are over-molded to the first ends of the one or more pairs of electrical terminals, the intermediate holder is over-molded to the body portion, and the sensor housing is over-molded onto the sensor body assembly.

In an embodiment, the supporting member includes a chip mounting portion defining the groove, a support portion providing the support, and a middle portion connected between the chip mounting portion and the support portion, the middle portion including a pair of passages that allow a pair of pins of each sensor chip to pass through, and a spacer configured to space the pair of pins apart and hold the pair of pins in place being provided between the pair of passages for each sensor chip.

In an embodiment, the spacer is configured to hold the pins in place by mounting the pins of the sensor chip in the passage and then being deformed or broken by force and/or heat.

In an embodiment, the spacer includes two arms protruding curvedly or rectilinearly from side walls defining the passage, or is in a form of a monolithic block or arm protruding from the side walls defining the passage.

In an embodiment, the supporting member further includes lugs protruding from two opposite sides of the support portion in the transverse direction, the lugs extending through the sensor housing and out of the wheel speed sensor.

In an embodiment, the lug includes a sealing flange extending outwardly from the lug in a plane perpendicular to the transverse direction.

The wheel speed sensor of the present application includes one or more sensor chips with two pins respectively and electrical terminals electrically connected to the pins of the sensor chip, each electrical terminal having an elongated shape. The wheel speed sensor further includes an end holder disposed near a soldering end of the elongated electrical terminal to increase the strength near the soldering end of the electrical terminal during a soldering operation between the soldering end of the electrical terminal and the pins of the sensor chip. The wheel speed sensor also includes at least one intermediate holder configured to hold the body portions of the electrical terminals stationary relative to each other. Maintaining no relative displacement between the elongated body portions of the electrical terminals is conducive to the accuracy or precision of the signal transmission of the wheel speed sensor.

BRIEF DESCRIPTION OF THE DRAWINGS

The wheel speed sensor of the present disclosure will be described in detail below with reference to the accompanying drawings as described below.

DETAILED DESCRIPTION

Figure 1:
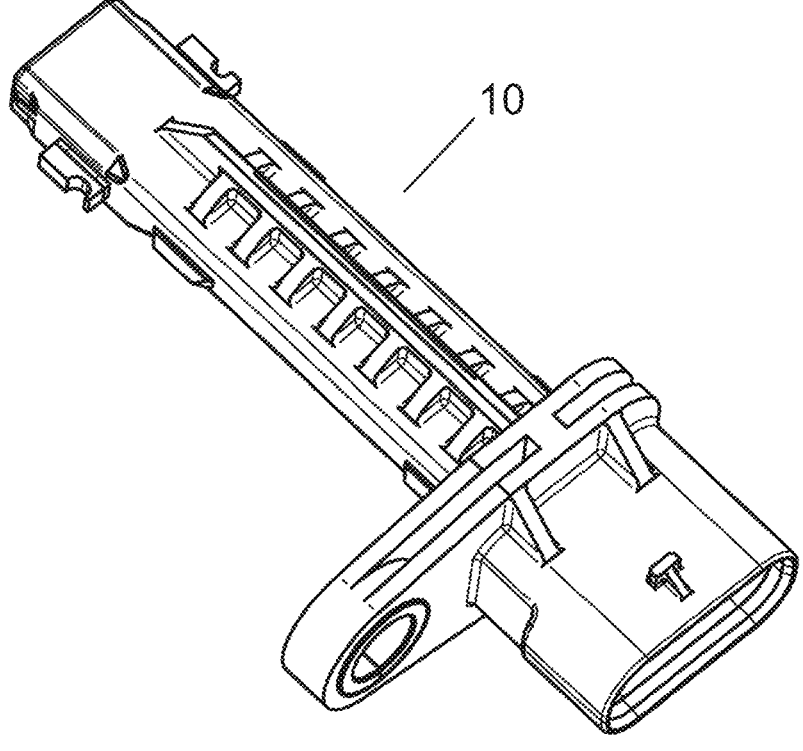
FIG. 1 is a perspective view of the appearance of a wheel speed sensor according to the present disclosure.
Figure 2:
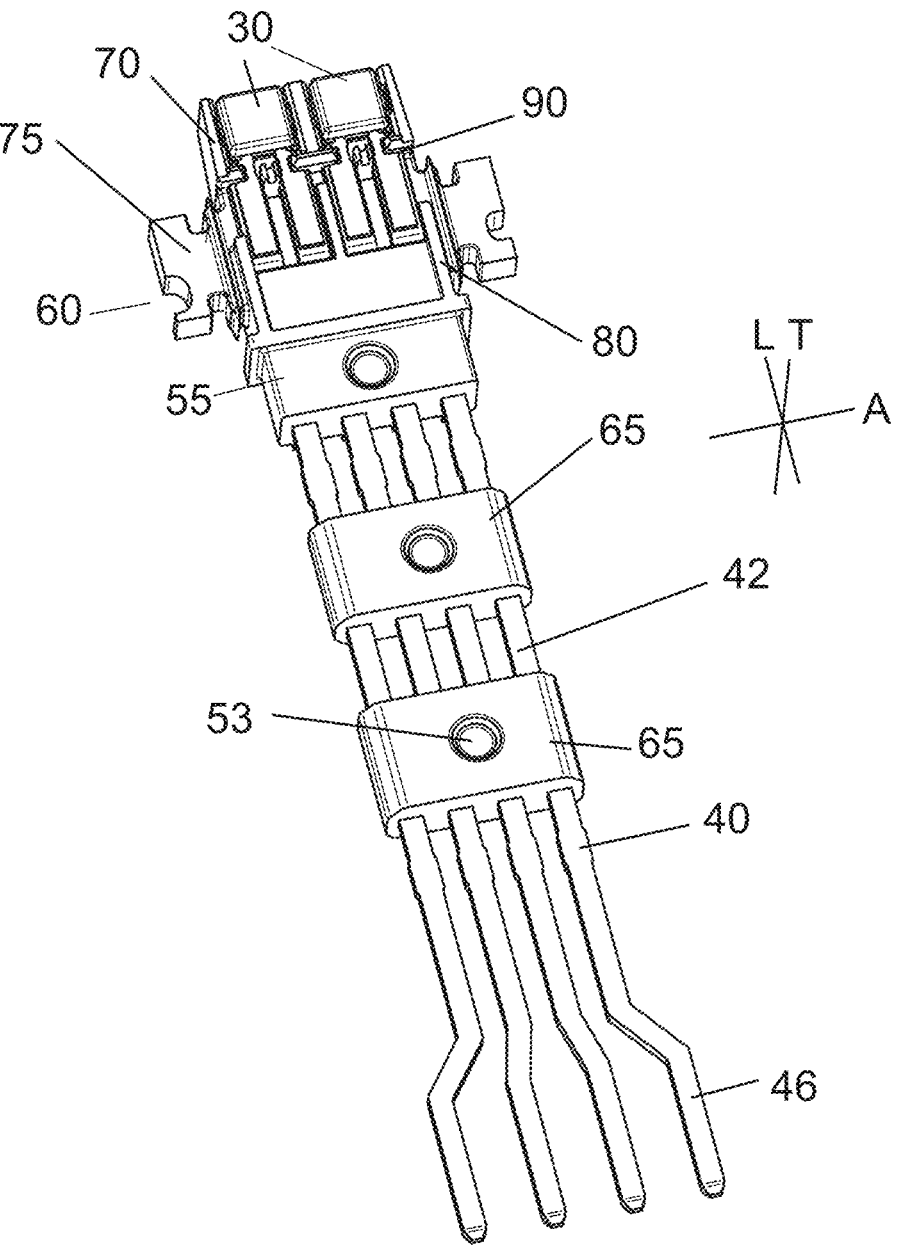
FIG. 2 is a perspective view of the sensor body assembly with the sensor housing removed.
Figure 3:
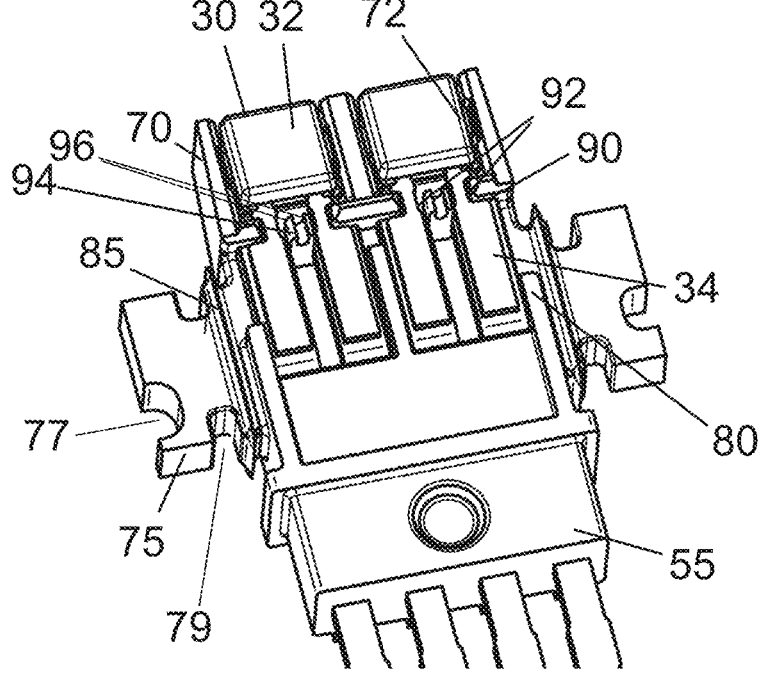
FIG. 3 is a partially enlarged view of FIG. 2, showing the supporting member and the end holder of the wheel speed sensor.

Referring first to FIG. 1, a perspective view of a wheel speed sensor according to the present disclosure is shown. The wheel speed sensor of the present application includes a sensor housing 10 and a sensor body assembly positioned inside the sensor housing 10. Referring to FIGS. 2 and 3, the sensor body assembly includes one or more (for example, two in the drawing) sensor chips 30, electrical terminals 40 electrically connected to the sensor chips 30 (for example, soldered together), an intermediate holder 65, an end holder 55, and a supporting member 60.

All electrical components for measuring the vehicle wheel speed have been integrally integrated in the sensor chip 30. In the illustrated embodiment, the wheel speed sensor includes two sensor chips 30 to meet the redundancy requirement for wheel speed information in some applications. Of course, wheel speed sensors provided with one or more than two sensor chips 30 are also within the protection scope of the present application. In order to perform operations such as signal interaction or receiving electric energy, each sensor chip 30 includes a chip body 32 and one or more pins 34 protruding from the chip body 32 (FIG. 3). For example, in the illustrated embodiment, a sensor chip 30 is provided with two pins 34 for interacting with the outside world for input or output signals.

Figures 4A, 4B, 4C:
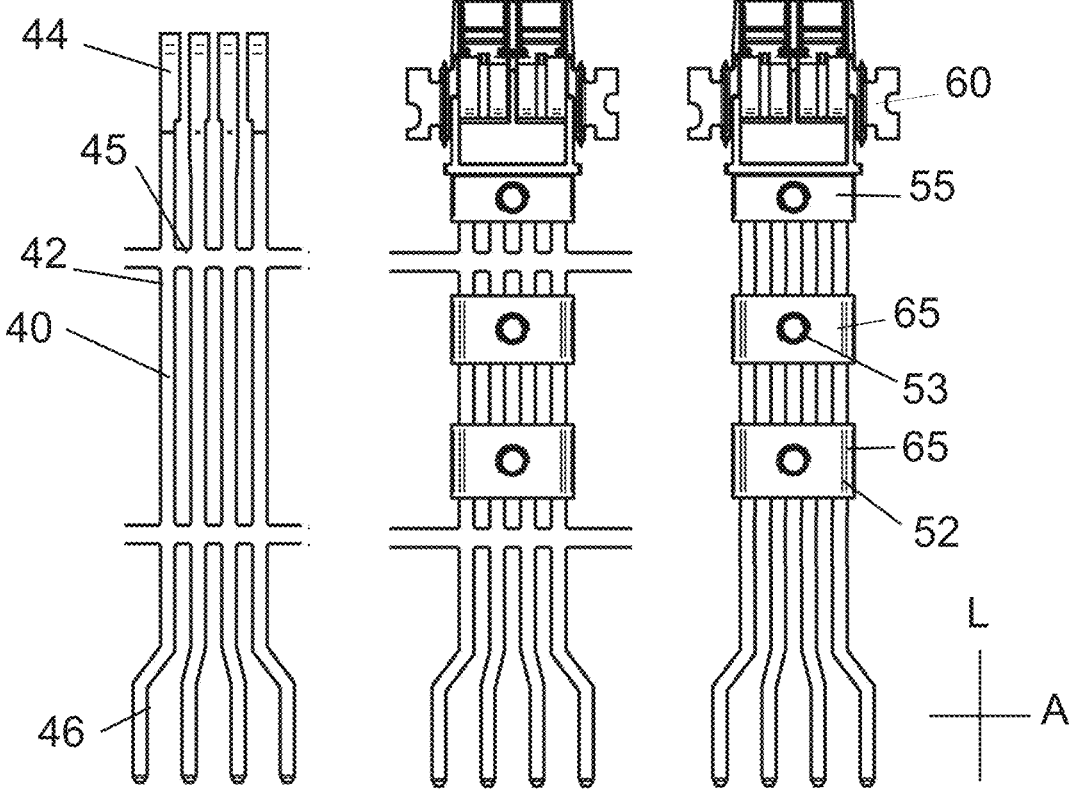
FIGS. 4a to 4c are schematic views of some of the steps in a process of forming the sensor body assembly.

Correspondingly, the electrical terminals 40 are also arranged in pairs, and each pair of electrical terminals 40 is electrically connected to two pins 34 of a sensor chip 30. One of the pair of electrical terminals 40 supplies power to the corresponding sensor chip 30, and the other transmits a sensing signal of the sensor chip 30 to a vehicle body line speed terminal (not shown). Referring to FIGS. 4a to 4c, each electrical terminal 40 includes a body portion 42 extending substantially in the longitudinal direction L and a first end 44 and a second end 46 opposite to each other. The first end 44 may be a sheet end and configured to be electrically connected to the pin 34 of the sensor chip 30, and the second end 46 may also be a sheet end and configured to be electrically connected to a port of the vehicle body line speed terminal. The sensor chips 30, the pins 34 protruding from the sensor chips 30 towards the electrical terminals 40, and the electrical terminals 40 are all arranged at intervals in a transverse direction A (FIG. 4C) perpendicular to the longitudinal direction L.

In the producing process, firstly, the electrical terminals 40 for the wheel speed sensor are formed simultaneously, for example, by stamping from the same blank. At this time, the electrical terminals 40 are aligned in the longitudinal direction L and spaced apart from each other in the transverse direction A and connected to each other to facilitate subsequent operations (see FIG. 4a). Then, the intermediate holder 65 is attached at the body portion 42 of each electrical terminal 40, and the end holder 55 and the supporting member 60 are attached near the first end 44 of each electrical terminal 40 (FIG. 4b). Usually, in one over-molding step, the end holder 55 and the supporting member 60 and the intermediate holder 65 are formed at the same time near the first end 44 and on the body portion 42 of each electrical terminal 40, and then the mechanical connection 45 between the electrical terminals 40 is disconnected, so that no electrical connection is generated between adjacent electrical terminals during official use (FIG. 4c).

By attaching the end holder 55, the intermediate holder 65 and the supporting member 60 externally in the form of an over-molding, the electrical terminals 40 remain spaced apart and juxtaposed in the transverse direction A, aligned in the longitudinal direction L, and coplanar with each other in a vertical direction T perpendicular to the transverse direction A and the longitudinal direction L after disconnecting the mechanical connection 45, and the electrical terminals 40 are held in a fixed position relative to each other, or do not move or shift relative to each other. In other words, the end and intermediate holders 55 and 65 are configured to keep the electrical terminals 40 from being displaced or moved relative to each other, especially when the elongated body portion 42 of the electrical terminal 40 has a dimension (length) in the longitudinal direction L several times larger than the dimension (width) in the transverse direction A.

As shown in the drawings, the structure of the end holder 55 is substantially the same as the structure of the intermediate holder 65. Providing an end holder 55 near the soldered end of each electrical terminal 40 can greatly enhance the strength at that end of the electrical terminal 40. Especially when performing soldering between the first end 44 of the electrical terminal 40 and the pin 34 of the sensor chip 30, the vicinity of the soldering portion becomes soft due to melting, and it is particularly advantageous to add the end holder 55 to improve strength. The end holder 55 may be formed integrally with the supporting member 60, or may be formed spaced apart from the supporting member 60. At the same time, the end holder 55 is also able to keep the ends of the electrical terminals 40 fixed relative to each other during the above-mentioned soldering operation, thus ensuring that no electrical short circuit occurs between the electrical terminals 40 during use.

The intermediate holder 65 is used to hold the body portion 42 of the electrical terminal 40 having a larger length dimension together. Similar to the end holder 55, the intermediate holder 65 may include a holder body 52 and a through hole formed on the holder boc R.399278-U202103488 MB electrical terminals 40 to extend therethrough.

The number of intermediate holders 65 and the interval between adjacent intermediate holders 65 can be determined based on the length of the electrical terminal 40, for example, two are shown in the drawing, and one, three, four or more intermediate holders 65 can be provided optionally. Under the condition that the above-mentioned holding function can be achieved, the intermediate holder 65 can have any desired outer profile, size, quantity, shape and the like. In the illustrated embodiment, the intermediate holder 65 has an oblong outer profile in a cross-section perpendicular to the longitudinal direction L, that is, the intermediate holder 65 surrounds each electrical terminal 40 circumferentially. Any other suitable outer profiles such as circular or polygonal are also conceivable.

The intermediate holder 65 may surround only a part of the electrical terminal 40 in the circumferential direction. Alternatively, in the vertical direction T perpendicular to both the longitudinal direction L and the transverse direction A, the intermediate holder 65 may be over-molded on only one side of the electrical terminal 40, or over-molded on the two opposing sides as shown in the drawing to completely surround each electrical terminal 40. For example, the intermediate holder 65 is composed of two half bodies facing each other in the vertical direction T, and the two half bodies are spaced apart and arranged oppositely, each covering a part of the electrical terminal 40.

The material forming the end and intermediate holders 55 and 65 and the supporting member 60 in the same step may be the same as (for example, both formed of plastic) or different from the material of the sensor housing 10. Additionally, a hole 53 in the intermediate holder 65 is shown as an auxiliary hole for use in the over-molding operation.

Referring back to FIGS. 2 to 5, the supporting member 60 includes a chip mounting portion 70, a support portion 80, and a middle portion 90 connecting the chip mounting portion 70 and the support portion 80. The chip mounting portion 70 defines a groove 72 used to mount every sensor chip 30. In the longitudinal direction L, the pin 34 of the sensor chip 30 passes through a passage 92 formed in the middle portion 90 and extends into contact with, including but not limited to overlapping or abutting against, the first end 44 of the electrical terminal 40.

On the middle portion 90, a spacer 94 is formed between two passages 92 for receiving the pins 34 of the same sensor chip 30. The spacer 94 is used to ensure that the two pins 34 of the same sensor chip 30 are spaced apart from each other in the transverse direction A without electrical short-circuits on the one hand, and is used on the other hand to hold the respective pins 34 after the sensor chip 30 and the pins 34 thereof are mounted in the groove 72 and the corresponding passage 92, in particular to keep the sensor chip 30 and the pins 34 stationary during the subsequent operation of soldering the pins 34 to the first ends 44 of the electrical terminals 40.

Keeping the pins 34 of the sensor chip 30 stationary within the corresponding passage 92 can be done in any suitable manner. In the illustrated example, the spacer 94 includes two arms 96 extending from the middle portion 90 (FIG. 3), and the two arms 96 curve R.399278-U202103488 MB each other and then inwardly towards each other as they extend away from the middle portion 90 (upward), forming an outer profile of a portion of an "O" shape. With this configuration, an effect of fixing the two pins 34 in place can be achieved by pressing (the two arms 96 of) the spacer 94 with force so that the spacer 94 is permanently deformed to press against respective parts of the two pins of the sensor chip after the pins 34 of the sensor chip 30 are mounted in the corresponding two passages 92. In other embodiments, the curved arms 96 in the drawing can be replaced by two arms extending parallel to each other in straight lines or inclined to each other, while achieving the same effect.

Apart from that, a person skilled in the art can conceive of any structure capable of achieving the same function by deforming or even breaking the spacer. Those skilled in the art can also imagine any means of deforming or breaking the spacer, including, but not limited to, deforming or breaking the spacer 94 under force, and/or deforming, breaking or melting the spacer by heat. In addition, the spacer 94 is not limited to the form of two arms 96, for example, it may be in the form of a block. It is also contemplated that the spacer is a portion protruding from the other side walls forming the corresponding passage 92, and it is possible to achieve the purpose of fixing the pins 34 of the sensor chip 30 in place by force or heat such as described above.

The supporting member 60 further includes lugs 75 protruding from two opposite sides of the support portion 80 in the transverse direction A. When the sensor housing 10 is over-molded onto the sensor body assembly, the lugs 75 of the supporting member 60 are used to support the sensor body assembly that has been formed as a whole by soldering or molding, etc., in a mold. The lug 75 includes a sealing flange 85 disposed close to the support portion 80. The sealing flange 85 is an annular flange extending outwardly from around the lug 75 in a plane perpendicular to the transverse direction A. Due to the presence of the sealing flange 85, a "labyrinth-like" opposing surface portion is formed between the inner surface of the corresponding portion of the sensor housing 10 which is subsequently molded on the sensor body assembly and the corresponding outer surface of the lug 75 of the supporting member 60. This is beneficial to, during the use of the wheel speed sensor after the wheel speed sensor is mounted on the vehicle, prevent external water, moisture or small dust [particles] and other impurities from entering the wheel speed sensor through the corresponding inner surface and outer surface, affecting the accuracy of the wheel speed sensor.

In addition, more preferably, the lug 75 of the supporting member 60 is made of the same material as that of the sensor housing 10, so that the subsequently injection-molded sensor housing 10 can be well integrated with the lug 75, which is more conducive to sealing.

Referring to FIG. 3, the lug 75 of the supporting member 60 includes a notch 77 recessed into the lug 75 from the outermost in the transverse direction A to facilitate handling by an operator. The lug 75 of the supporting member 60 further includes a notch 79 recessed into the lug 75 from the opposite side in the longitudinal direction L to allow the sensor housing 10 subsequently molded thereon to be more securely attached to the sensor body assembly.

Although specific embodiments of the present disclosure are described in detail herein, they are presented for purposes of explanation only and should not be considered as limiting the scope of the present disclosure. In addition, it should be clear to those skilled in the art that the various embodiments described in the present disclosure can be used in combination with each other. Various alternatives, changes and modifications can be devised without departing from the spirit and scope of the present disclosure.

What is claimed is:

1. A wheel speed sensor, comprising:
a sensor housing; and
a sensor body assembly positioned inside the sensor housing, the sensor body assembly comprising:
    one or more sensor chips, each of the sensor chips including a chip body and a pair of pins, which are spaced apart in a transverse direction and protrude from the chip body;
    one or more pairs of electrical terminals, each pair of the electrical terminals being electrically connected to the pair of pins of one of the one or more sensor chips, each electrical terminal including an elongated body portion extending in a longitudinal direction perpendicular to the transverse direction and a first end electrically connected to a corresponding pin of the pair of pins of the one of the one or more sensor chips;
    a supporting member overmolded to the first end of each electrical terminal such that the supporting member surrounds a first section of the first end of each electrical terminal, the supporting member defining a groove in which every sensor chip of the one or more sensor chips is mounted, the groove providing support for the electrical connection between the pair of pins of each of the one or more sensor chips and the first end of the electrical terminal, the groove being open to a side of the supporting member;
    an end holder overmolded to each electrical terminal so as to surround a second section of the first portion of each electrical terminal and prevent displacement of each electrical terminal relative to each other; and at least one intermediate holder attached to the body portion of each electrical terminal to prevent displacement of the body portion of each electrical terminal relative to each other, wherein each corresponding pin includes a first side facing toward a base of the groove and a second opposite side facing an open side of the groove, the first end of each of the electrical terminals is arranged between the first side of the corresponding pin and the base of the groove, wherein the supporting member further includes lugs protruding from two opposite sides of the support portion in the transverse direction, the lugs extending through the sensor housing and out of the wheel speed sensor, each lug having a lateral outside surface defining a first notch and two opposing longitudinal surfaces, each of which includes a second notch, wherein the sensor housing is molded into each of the second notches.

2. The wheel speed sensor according to claim 1, wherein:

the end holder and the supporting member are formed integrally or are spaced apart from each other; and/or the at least one intermediate holder includes only one intermediate holder, or includes a plurality of intermediate holders spaced apart from each other in the longitudinal direction.

3. The wheel speed sensor according to claim 2, wherein the end holder and/or the intermediate holder have an oblong or polygonal outer profile in a cross-section perpendicular to the longitudinal direction, respectively, and includes a through hole allowing each of the electrical terminals to extend through.

4. The wheel speed sensor according to claim 3, wherein the intermediate holder includes two half bodies opposite to each other, and the through hole is jointly defined by the two opposite half bodies.

5. The wheel speed sensor according to claim 1, wherein the sensor housing is over-molded onto the sensor body assembly.

6. The wheel speed sensor according to claim 1, wherein the supporting member includes a chip mounting portion defining the groove, a support portion providing the support, and a middle portion connected between the chip mounting portion and the support portion, the middle portion including a respective pair of passages for the pair of pins of each sensor chip through which the pair of pins passes, and a spacer arranged between the pair of passages that is configured to space the pair of pins apart and hold the pair of pins in place.

7. The wheel speed sensor according to claim 6, wherein the spacer is configured to hold the pins in place by mounting the pins of the sensor chip in the passage and then being deformed or broken by force and/or heat.

8. The wheel speed sensor according to claim 7, wherein the spacer includes two arms protruding curvedly or rectilinearly from side walls defining the passage, or is in a form of a monolithic block or arm protruding from the side walls defining the passage.

9. The wheel speed sensor according to claim 1, wherein the lug includes a sealing flange extending outwardly from the lug in a plane perpendicular to the transverse direction.

10. The wheel speed sensor according to claim 6, wherein each pair of passages is open to the side of the supporting member to which the groove opens.

11. The wheel speed sensor according to claim 1, wherein the at least one intermediate holder is overmolded over a section of the body portion of each electrical terminal so as to surround the section of the body portion and prevent displacement of each electrical terminal relative to each other.

* * * * *